United States Patent [19]

O'Toole

[11] Patent Number: 5,193,868
[45] Date of Patent: Mar. 16, 1993

[54] FLOATING TAPPING PLATE ASSEMBLY

[76] Inventor: John T. O'Toole, 4803 Sherwell Dr., Waterford, Mich. 48327

[21] Appl. No.: 904,092

[22] Filed: Jun. 25, 1992

[51] Int. Cl.$^5$ .............................................. E05B 15/02
[52] U.S. Cl. .................................. 292/341.15; 411/103
[58] Field of Search ............... 292/340, 341.15, 341.18, 292/341.19; 411/103, 108, 104, 85

[56] References Cited

U.S. PATENT DOCUMENTS

| | | | |
|---|---|---|---|
| 2,455,145 | 11/1948 | Swanstrom | 411/85 |
| 4,432,575 | 2/1984 | Garvey et al. | 292/341.18 |
| 4,826,374 | 5/1989 | Baglin | 411/103 |

Primary Examiner—Rodney M. Lindsey

[57] ABSTRACT

An improved tapping plate and retention bracket assembly for attaching a threaded bolt in a adjustable manner relative to a support structure such as a vehicle door pillar, for example. The bracket comprises a generally rectangular planar portion bordered by a pair of upstanding end flanges having diametrically opposed retention slots. The tapping plate has a generally rectangular base portion formed with oppositely projecting first and second tongues extending from each end thereof and first and second pairs of opposed bendable prongs, of lesser length than the tongues, positioned in spaced relationship on either side of an associated tongue. In one mode of assembly both pairs of prongs may be initially preformed at a first acute angle from the base portion enabling the first tongue to be inserted through one end flange retention slot with its associated preformed pair of prongs contacting the one end flange enabling the second tongue to be inserted through the other retention slot. Thereafter, the plate is centered and both pairs of preformed prongs are bent downwardly to a second lesser acute angle whereby the plate is captured on the bracket in a floating manner whereby the position of the plate bore may be varied relative to the bracket clearance aperture.

3 Claims, 3 Drawing Sheets

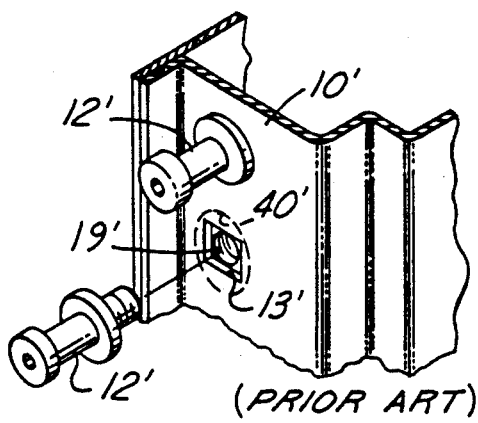
(PRIOR ART)
FIG.1A
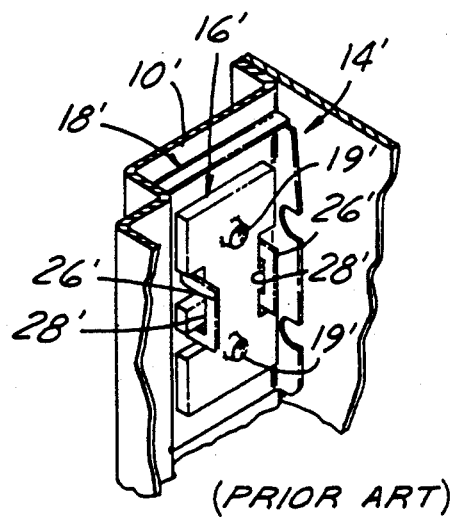
(PRIOR ART)
FIG.1B
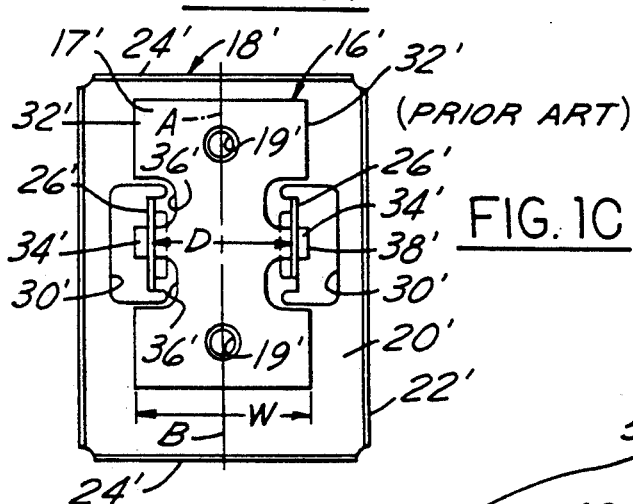
(PRIOR ART)
FIG.1C
FIG.5
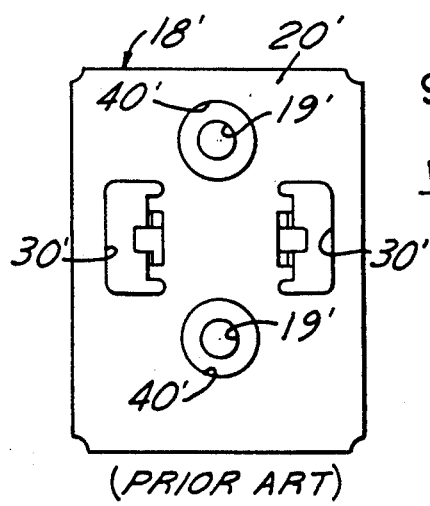
(PRIOR ART)
FIG.1D
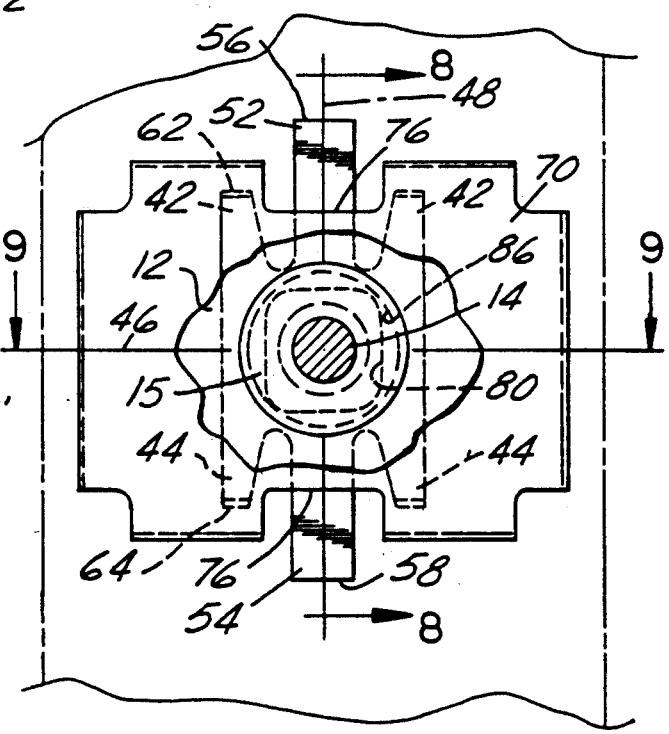

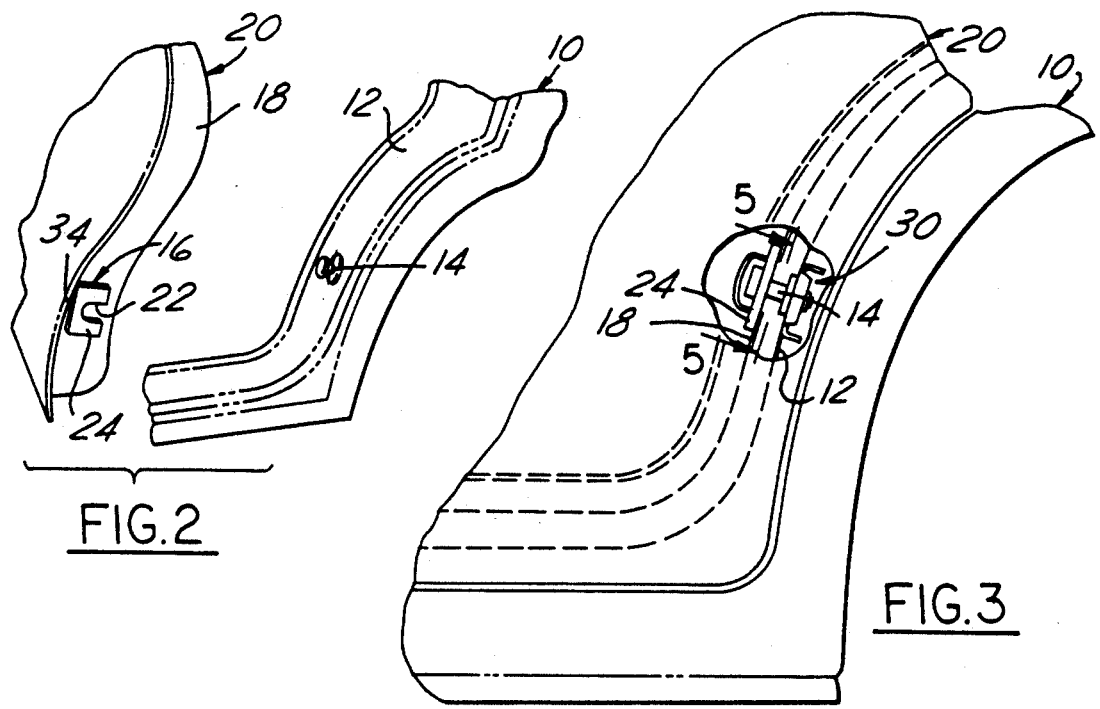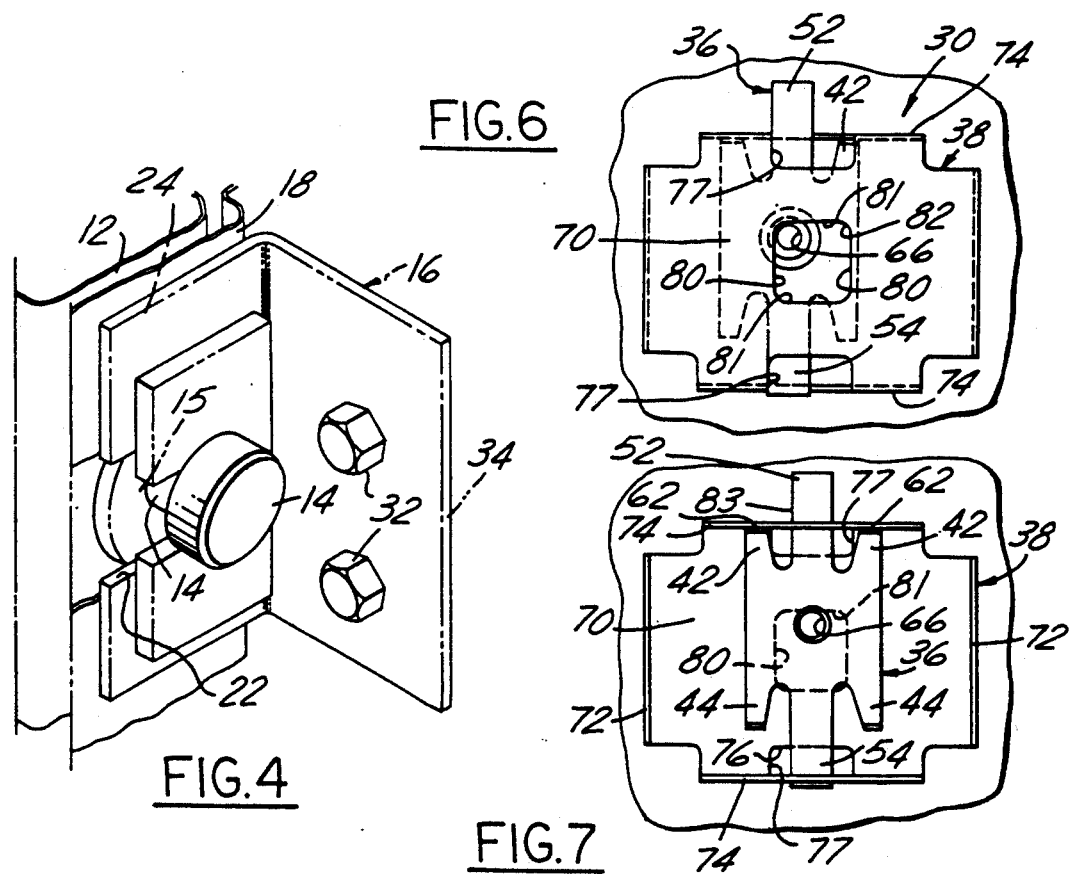

FLOATING TAPPING PLATE ASSEMBLY

BACKGROUND OF THE INVENTION

This invention relates generally to adjustable anchor or tapping plate mechanisms and more particularly to a floating tapping plate and retention bracket assembly for threadably securing a bolt to a frame structure such as a vehicle body door pillar.

One example of a prior art floating tapping plate assembly is disclosed in the U.S. Pat. No. 4,432,575 issued Feb. 21, 1984 to Garvey et al. entitled Lock Striker Anchor Plate Assembly. In the Garvey patent, the adjustable lock striker bolt assembly for a vehicle door lock pillar includes an anchor plate which is manually snap assembled to a retention bracket by an operator without tools and with limited access to the inside of the lock pillar.

With reference to prior art FIG. 1A of the drawings, there is shown a vehicle door lock pillar 10' having a pair of threaded and shouldered striker bolts 12'. The lower removed striker bolt is shown positioned to initially pass through pillar rectangular oversize aperture 13'. Prior art FIG. 1B shows the interior surface of the pillar 10' having a tapping plate and retention bracket assembly, generally indicated at 14', mounted thereon. The assembly 14' comprises a tapping plate 16' supported in a floating or adjustable manner on an underlying retention bracket 18'. In FIG. 1C, the tapping plate 16' is shown positioned with its longitudinally extending axis of symmetry "A" coaxial with longitudinal axis of symmetry "B" of the retention bracket 18'. It will be noted that the tapping plate 16' has a pair of extruded conical socket portions raised above the tapping plate surface defining internally threaded passages or bores 19' symmetrically aligned on its axis "A".

Prior art FIG. 1C shows the retention bracket 18' comprising a rectangular shaped planar portion 20' defined by a pair of longitudinal side flanges 22' and a pair of transverse end flanges 24' projecting normally therefrom. The bracket 18' is provided with a pair of mirror image U-shaped bendable stirrups 26' projecting normally from the bracket's one exterior surface defining opposed laterally spaced through slots 28' shown in FIG. 1B. As best seen in FIG. 1C, the stirrups 26' are pierced or lanced-out from the bracket planar portion 20' thereby forming a pair of generally rectangular shaped openings 30' therein.

The tapping plate 16' comprises a base 17' generally rectangular in plan having its longitudinal edges 32' provided with a pair of oppositely projecting transversely extending tongues 34'. FIG. 1C shows each tongue 34' defined by a pair of matching cutouts 36' formed in each tapping plate side edge 32' such that each tongue free edge 38' is aligned with its associated side edge 32'. The U-shaped stirrups 26' are transversely spaced a distance "D" apart which is a predetermined dimension less than the width "W" of the tapping plate.

The tapping plate and retention bracket assembly 14' is fabricated by centering the tapping plate 16' on the bracket interior planar portion 20', as shown in FIG. 1C, with the bendable stirrups 26' being initially located in the plane of the bracket planar portion 20'. Thus, upon the stirrups 26' being bent at right angles from the plane of portion 18', each of their stirrups 26' are sized to be bent over and receive their associated tapping plate tongues 34' therethrough. In this manner the tapping plate 16' is loosely retained or captured on the bracket 18' with its pair of threaded passages 19' aligned on bracket axis "B" so as to be concentrically disposed relative to a pair of enlarged clearance holes 40' in the bracket 18', as viewed in FIG. 1D.

As seen in FIGS. 1A and 1D, the pair of vertically spaced clearance circular apertures 40', extending through bracket 18', are located generally on center with an associated one of a pair of vertically spaced oversized square apertures 13' provided in the body pillar 10'. The tapping plate 16' is slidably adjusted enabling each striker bolt 12 to pass through its associated pillar oversize aperture 13' and bracket clearance aperture 40' and thereafter threaded into a respective aligned tapping plate bore 19'. As a result, torquing the bolts 12 clamps the bracket portion 20' between the tapping plate 16 and the opposed surface of the body pillar 10'. To permit accurate alignment of the tapping plate threaded bores 19' with their associated bracket clearance apertures 40', it is necessary that the tapping plate 16' float laterally providing a limited range of both vertical and horizontal movement in addition to allowing inward and outward axial play. Thus, the tapping plate 16' is adapted to adjust to accommodate location of the striker bolts 12' by virtue of the bolts clamping the tapping plate in place when tightened. Because of the manner in which automobile bodies are constructed, the tapping plate, at the time when the door is hung, is only accessible through the pillar oversized apertures 13' disregarding certain vehicle body structure interior hand access passages (not shown).

SUMMARY OF THE INVENTION

Accordingly, it is an object of the present invention to provide a novel and improved floating tapping plate and retention bracket assembly to simply and reliably secure one or more bolts to a supporting structure such as, for example, an automotive vehicle body door pillar.

It is another object of the present invention to provide a novel and improved tapping plate and retention bracket assembly as set forth above wherein an improved fabrication arrangement results in reduced manufacturing costs.

Another object of this invention is to provide a novel and improved floating tapping plate and retention bracket assembly as set forth above wherein the assembly may be readily fabricated in by means of either a first or second mode. In the first mode one of a pair of slotted end flanges of the retention bracket is initially formed coplanar with the bracket body portion while the opposite end flange is formed in an upstanding manner. The tapping plate, formed with a pair of opposite coplanar tongues, is symmetrically oriented in a predetermined position on the bracket with its one tongue extending through the upstanding flange slot. Next, the coplanar flange is bent from its planar position to an upstanding position thereby trapping the other tongue in the opposite end flange slot. Each of the tapping plate tongues are straddled by a pair of mirror image prongs angled upwardly from the plane of the tapping plate in a determined manner. The prongs are of lesser extent than the tongues such that they contact their associated retention bracket slotted end flanges after predetermined longitudinal floating travel thereby capturing the tapping plate on the retention bracket.

The second fabrication mode involves initially forming the retention bracket such that both its slotted end flanges are each bent to their final upstanding mirror image position. However, at least one pair of the tapping plate prongs are initially pre-formed to a predetermined near-vertical or first installation angled position. This enables their associated tongue portion to be inserted through one bracket end flange slot a predetermined length until the preformed prongs contact their associated end flange. As a result, the tapping plate is free to be positioned in a flush manner on the bracket body portion by virtue of the opposite tongue portion clearing its associated bracket end flange for positioning in its end flange retention slot. As a final step, the tapping plate is shifted longitudinally to its centered position on the bracket the preformed prongs are bent downwardly from their first near vertical installation position to their final extended position readily capturing the tapping plate on the retention bracket.

BRIEF DESCRIPTION OF THE DRAWINGS

Other features and advantages of the invention, such as reduced number of parts and improved adjustability, will be evident from the following detailed description of the preferred embodiment of the invention and the accompanying drawings wherein:

FIG. 1A is a fragmentary perspective view of a vehicle door pillar supporting a pair of lock striker bolts, with one bolt removed, by means of a prior art floating tapping plate assembly;

FIG. 1B is a fragmentary perspective view of the reverse side of the door pillar of FIG. 1A showing the prior art floating tapping plate assembly fixed thereto;

FIG. 1C is an enlarged front elevational detail view of the prior art floating tapping plate assembly shown in prior art FIG. 1B;

FIG. 1D is an elevational view of the reverse side of the prior art assembly shown in FIG. 1C;

FIG. 2 is a fragmentary perspective view of a vehicle open door showing a portion of the edge and its associated vehicle body door pillar supporting a striker bolt;

FIG. 3 is a fragmentary enlarged side elevational view of the vehicle door of FIG. 2 in its closed position relative the body door pillar with parts broken away to show the floating tapping plate and retention bracket assembly with the striker bolt engaged with an interlock angle member;

FIG. 4 is an enlarged fragmentary perspective view of the striker bolt and interlock angle member;

FIG. 5 is an enlarged fragmentary elevational view, with parts broken away, taken in the direction of line 5—5 of FIG. 3;

FIG. 6 is a view similar to FIG. 5 showing the tapping plate shifted vertically from its centered FIG. 5 mode to its upper-most limit relative to its underlying retention bracket;

FIG. 7 is a view similar to FIG. 5 showing the tapping plate shifted diagonally from its centered FIG. 5 mode to its upper-most and left-most limits relative to its underlying retention bracket;

DETAILED DESCRIPTION OF THE PREFERRED EMBODIMENT

Figure 8:
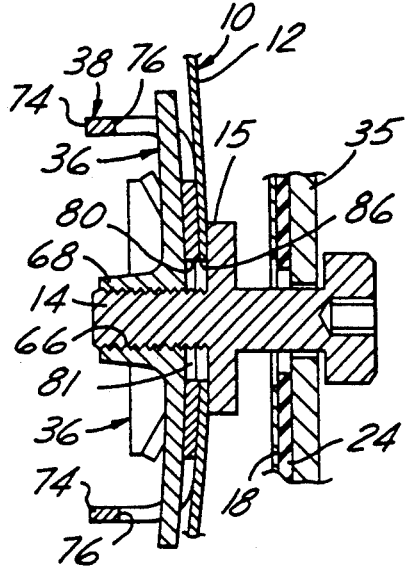
FIG. 8 is a fragmentary cross sectional view taken on the line 8—8 of FIG. 5.
Figure 9:
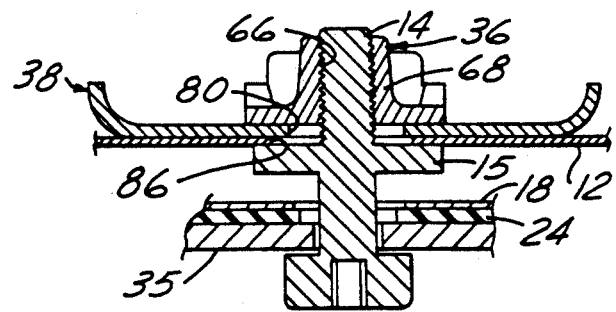
FIG. 9 is a fragmentary cross sectional view taken on the line 9—9 of FIG. 5.

Referring now to FIG. 2 of the drawings, there is shown a portion of a motor vehicle 10 having a door lock pillar 12 supporting a striker bolt 14. The striker bolt 14 is adapted for interlocking engagement with a lock angle member 16 mounted on lateral flange 18 of a vehicle side door, partially shown at 20 in FIG. 2 in its open position. With reference to FIGS. 3 and 4, the door is shown in its closed position wherein the striker bolt 14 is captured in a rounded guide recess 22 formed in lock angle member locking flange 24 flush with door lateral flange 18. The striker bolt 14, formed with an annular shoulder 15 axially spaced from the bolt head, is threaded into a floating tapping plate and retention bracket assembly, generally indicated at 30 in FIG. 3. It will be noted in FIG. 4 that the lock angle member 16 is fixed to the door 20 by means of a pair of fasteners 32 extending through the mounting flange 34. Further, it will be seen in FIGS. 4, 8 and 9 that a filler or shim plate 35 is provided between the flange 24 and the bolt head depending upon the particular installation.

Figure 11:
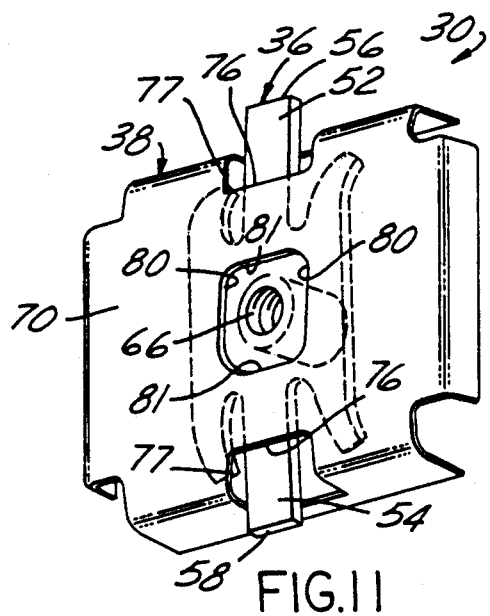
FIG. 11 a perspective view of the underside of the retention bracket of FIG. 10.
Figure 10:
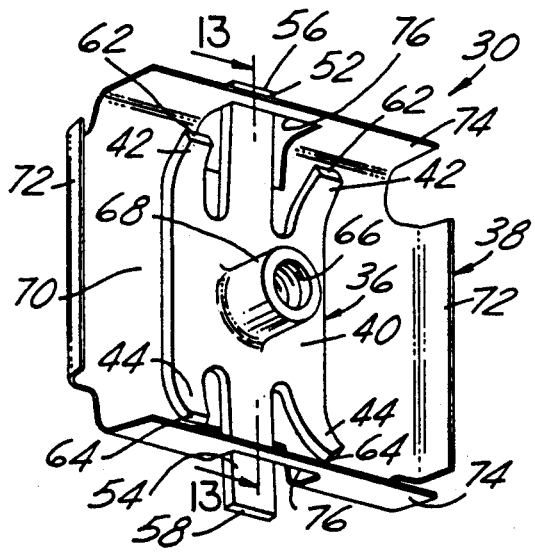
FIG. 10 is a perspective view of the floating tapping plate and the upper side of the retention bracket of the present invention.

As best seen in FIGS. 5, 10 and 11, the tapping plate and retention bracket assembly 30 comprises a tapping plate 36 and an underlying retention bracket 38 adapted to floatingly capture the tapping plate thereon permitting aligned adjustment for receiving the bolt 14. The tapping plate 36 is formed from a sheet metal stock having a generally rectangular flat base portion 40 formed with a first pair of mirror image bendable prongs 42 at each corner of one end and a second pair of diametrically opposed mirror image bendable prongs 44 at each corner of an opposite end. It will be noted in FIG. 5 that the first and second pair of elongated prongs are symmetrically disposed about a transverse line of symmetry 46 and a longitudinal line of symmetry 48.

The tapping plate 36 further comprises a pair of diametrically opposed longitudinally extending mirror image elongated tongues 52 and 54 symmetrically disposed about the longitudinal line of symmetry 48 and lying in the plane of the base portion 40. It will be seen that each of the rectangular shaped tongues 52 and 54 is straddled in a spaced manner by respective pairs of prongs 42 and 44. Each tongue has its free end 56 and 58 extending a predetermined dimension beyond respective free ends 62 and 64 of its associated pair of prongs 42 and 44, respectively. It will be noted in FIG. 10 that the tapping plate base portion 40 is provided with a central internally threaded through bore 66 of tubular central upstanding extrusion 68.

With reference to FIG. 10, the retention bracket 38 comprises a generally rectangular planar body portion 70 bordered by a pair of longitudinal upstanding side flanges 72—72 and a pair of transverse upstanding end flanges 74—74 projecting generally normally from the body portion 70. The retention bracket 38 is shown in FIG. 5 and formed symmetrical about the longitudinal 48 and transverse 46 center lines which intersect the principal axis "A" (FIG. 13) of the central through bore 66. Each of the end flanges 74—74 is formed With a rectangular retention slot, defined by transverse edges 76 and longitudinal stop edges 77, adapted to receive therethrough an associated tapping plate tongue. As seen in FIGS. 6 and 7, the bracket body portion 70 is provided with a generally rectangular shaped central clearance aperture 80, which in the preferred embodiment is a square with radiused corners. In its initial or centered mode of FIG. 5 the square clearance aperture 80 has its center aligned with the intersection of the transverse 46 and longitudinal 48 axes of symmetry.

Figure 12:
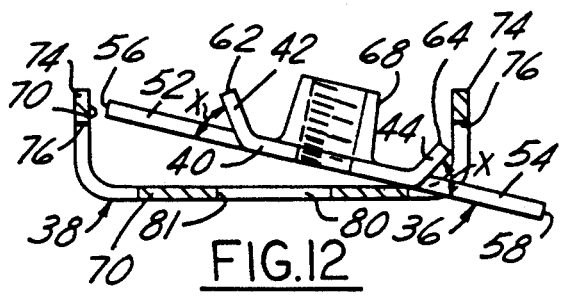
FIG. 12 is a vertical cross sectional view, partly in elevation, showing an initial step in the assembly of the tapping plate the retention bracket.

FIG. 12 shows the tapping plate and retention bracket assembly 30 being assembled in a first mode by initially having each pair of the tapping plate bendable tangs 42 and 44 pre-formed at a predetermined first acute angle "X" from the plane of the base portion 40 which angle "X" in the disclosed form is about 60 degrees. It will be seen in FIG. 12 that the tapping plate 36, in its first assembly mode, is oriented with one of its tongues 54 inserted through an end flange or retention slot 76 such that its associated pair of straddling prongs 44 have their free distal ends 64 contacting the opposed inner surface of their respective bracket end flange 74.

Figure 13:
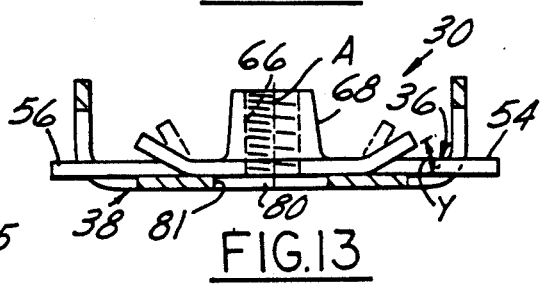
FIG. 13 is a view similar to FIG. 12 showing the completed assembly with the tapping plate captured on the retention bracket.

As seen in FIG. 12, this enables the tapping plate opposite tongue free end 56 to just clear its associated bracket end wall inner surface 75 whereby the tapping plate flat base portion 40 is moved into flush engagement with the mounting plate planar portion 70. Thereafter, the tapping plate member 36 is moved on the supporting bracket along its longitudinal axis 48 until the principal axis "A" of the tapping plate member threaded bore 66 coincides with the center of bracket planar portion central rectangular clearance aperture, defined by transverse internal edges 80 and longitudinal internal edges 81, as seen in FIG. 13. Next, the two pair of pre-formed prongs 42 and 44 are bent downwardly by suitable tool means to a second lesser acute angle "Y" providing the assembly 30, shown in full lines in FIG. 13, capturing the tapping plate 36 on the bracket 38.

Figure 14:
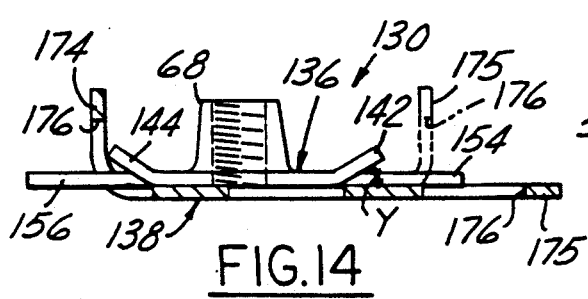
FIG. 14 is a vertical cross sectional view, partly in elevation, showing an alternative method of assembling the tapping plate on the retention bracket.

With reference to FIG. 14, an alternative second mode or arrangement for assembling a tapping plate and bracket assembly 130 is shown with corresponding reference numerals being used, with one hundred being added thereto, for like or corresponding elements. It will be seen in FIG. 14 that initially one left hand end flange 174 is located in its final position substantially normal to the plane of the bracket body portion 170. The remaining right hand end flange 175, however, is initially preformed in the plane of the bracket body portion 170. The FIG. 14 mode shows both pairs of the tapping plate bendable prongs 142—142 and 144—144 bent downwardly to a predetermined common acute angle which in the disclosed embodiment is equal to acute angle "Y" of the first assembling arrangement of FIGS. 12 and 13.

The tapping plate 136 is initially positioned with its one left hand tongue 156 inserted through the left hand end flange retention slot 176 such that its associated pair of prongs 144 have their free distal ends contacting the opposed inner surface of the left hand end flange 174. As thus positioned, the right hand end flange 175 is bent upwardly substantially ninety degrees by a suitable forming tool (not shown) from its full line horizontal assembly position to its vertically extending dashed line final upstanding position wherein its associated right hand tongue 154 is trapped in associated right hand end flange slot 176. Thus, in this alternative mode the tapping plate 136 is captured on the retention bracket 138 in the same manner as in the first assembly bracket assembly 30 shown in FIGS. 12 and 13.

As best seen in FIGS. 6 and 7, the tapping plate internally threaded bore 66 of the assembly 30 is adapted for limited longitudinal and transverse predetermined adjustable movement relative to the bracket rectangular shaped central clearance aperture 80, 81. It will be noted in FIG. 6 that the central aperture is essentially square while having its corners 82 radiused to conform with through bore 66 in its maximum combined transverse and longitudinal adjustable travel from its centered position of FIG. 5.

The extent of the tapping plate adjustable movement is determined in part by the transverse travel of the tongues 52 and 54 relative to the width of their associated retention slots. In FIG. 6, it will be seen that upon the tapping plate 36 being slidably moved to its maximum transverse or leftward position each of the tongues 52 and 54 are disposed with their respective leading longitudinal edges 83 contacting their associated retention slot longitudinal stop edges 77. As a result, the bracket central aperture 80 is open to the tapping plate threaded bore 66 and body pillar oversize aperture 86.

With reference to FIG. 7, the tapping plate 36 is shown slidably moved to its maximum longitudinal or uppermost position, with each one end prong free edge 62 contacting the opposed surface of their associated end retention flange 74, the support sheet central aperture 80 is open to the tapping plate threaded bore 66 by virtue of being positioned tangent to an associated transverse edge 81 of the central aperture. It will also be observed in FIG. 7 that the tongue 52 has a predetermined width relative to the predetermined width of the retention slot. As a result, with the tongue side edge 83 contacting a slot side edge 77 a portion of its associated one prong 42, which is partially moved transversely in overlying relation to its retention slot, maintains contact with end flange 74.

While there is described above the principles of this invention in connection with a specific embodiment, it is to be clearly understood that this description is made only by way of example and not as a limitation to the scope of this invention.

What is claimed is:

1. An adjustable tapping plate and retention bracket assembly comprising:
    a retention bracket disposed about longitudinal and transverse intersecting axes of symmetry, said retention bracket having a planar body portion defined in part by a pair of opposed transversely extending upstanding end flanges, each of said end flanges provided with a retention slot having longitudinal side edges equally spaced a predetermined dimension from said longitudinal axis, said body portion provided with an access aperture having its center located at the intersection of said axes;
    a tapping plate member adapted to overlie said retention bracket body portion for controlled movement relative thereto, said tapping plate adapted for symmetrical disposition about said longitudinal and transverse intersecting axes of symmetry, said tapping plate member having a flat base portion providing first and second oppositely extending elongated tongues extending longitudinally therefrom so as to be symmetrically disposed about said longitudinal axis, said tapping plate base portion having a central internally threaded bore for receiving a threaded fastener therethrough;

said tapping plate provided with first and second pairs of elongated oppositely projecting prongs extending longitudinally from each end of said base portion, each said pair of prongs positioned in transverse spaced relationship on either side of their associated tongue, said prongs distal ends initially preformed so as to extend upwardly from the plane of said base portion at a predetermined first acute angle;

each said tapping plate first and second tongue having a free end thereof spaced a predetermined longitudinal distance beyond the distal ends of their respective first and second pair of preformed prongs, thereby enabling said first tongue to be inserted through one end flange retention slot a sufficient distance until its associated one pair of preformed prong distal ends contact said one end flange opposed inner surface, whereby said second tongue being free to just clear the other end flange during downward movement of said tapping plate enabling flush contact of said tapping plate base portion on said retention bracket body portion, resulting in said tapping plate second tongue being free for insertion through the other end flange slot; and whereby upon each of said pair of preformed prongs being bent downwardly toward said retention bracket planar portion to a second predetermined acute angle less than said first acute angle said tapping plate being captured on said retention bracket in a controlled slidably movable manner to vary the location of said tapping plate bore into alignment with said fastener when said fastener is inserted into said retention bracket access aperture.

2. The adjustable floating tapping plate and retention bracket assembly as set forth in claim 1 wherein the tapping plate having only one pair of its prongs adapted to contact said one flange inner surface being initially preformed to said first acute angle and the remaining pair of prongs being initially bent downward to said second predetermined acute angle position such that upon said tapping plate base portion being in flush contact with said retention bracket body portion only said one pair of preformed prongs are bent downwardly to said second acute angle position resulting in said tapping plate being captured on said retention bracket.

3. The adjustable floating tapping plate and retention bracket assembly as set froth in claim 1 wherein:

said tapping plate having both pairs of said prongs being initially bent downward to said second predetermined acute angle position and said retention bracket having one end flange initially preformed to a position coplanar with said body portion;

wherein upon said first tongue being inserted through said oppossite upstanding retention flange slot a sufficient distance such that its associated pair of prong distal ends contact an inner surface of said opposed end flange, whereby said one preformed end flange is then bent to an upstanding position such that said second tongue extends through said one retention slot causing said tapping plate to be captured on said retention bracket for longitudinal and transverse movement in a controlled manner relative thereto.

* * * * *

UNITED STATES PATENT AND TRADEMARK OFFICE
CERTIFICATE OF CORRECTION

PATENT NO. : 5,193,868
DATED : March 16, 1993
INVENTOR(S) : John T. O'Toole

It is certified that error appears in the above-indentified patent and that said Letters Patent is hereby corrected as shown below:

On the Title page, col. 1, item [56] insert "Edward P. Barthel" in the Attorney, Agent or Firm--.

Signed and Sealed this

Twenty-second Day of February, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,193,868
DATED : March 16, 1993
INVENTOR(S) : O'Toole

It is certified that error appears in the above-indentified patent and that said Letters Patent is hereby corrected as shown below:

ON THE TITLE PAGE, in Assignee block #73, insert --Chrysler Corporation--

Signed and Sealed this

Twenty-first Day of June, 1994

Attest:

BRUCE LEHMAN

*Attesting Officer*     *Commissioner of Patents and Trademarks*